United States Patent
Brabson et al.

(10) Patent No.: US 7,913,262 B2
(45) Date of Patent: Mar. 22, 2011

(54) METHOD AND SYSTEM FOR IMPROVED COMPUTER NETWORK EFFICIENCY IN USE OF REMOTE PROCEDURE CALL APPLICATIONS

(75) Inventors: Roy Frank Brabson, Raleigh, NC (US); John J. Majikes, Apex, NC (US); Janet C. Wolf, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1325 days.

(21) Appl. No.: 11/308,995

(22) Filed: Jun. 5, 2006

(65) Prior Publication Data

US 2007/0283367 A1 Dec. 6, 2007

(51) Int. Cl.
*G06F 9/44* (2006.01)
*G06F 9/54* (2006.01)
(52) U.S. Cl. ...................................... 719/315
(58) Field of Classification Search ............. None
See application file for complete search history.

(56) References Cited

U.S. PATENT DOCUMENTS

| | | | | |
|---|---|---|---|---|
| 6,141,689 A | * | 10/2000 | Yasrebi | 709/228 |
| 2002/0091853 A1 | * | 7/2002 | Moore et al. | 709/236 |
| 2002/0169820 A1 | * | 11/2002 | Sayan et al. | 709/203 |
| 2002/0169980 A1 | * | 11/2002 | Brownell | 713/201 |

OTHER PUBLICATIONS

RFC Internet Standard 1831, Aug. 1995, 19 pages.
RFC Internet Standard 1832, Aug. 1995, 26 pages.
RFC Internet Standard 1833, Aug. 1995, 14 pages.

* cited by examiner

*Primary Examiner* — Li B Zhen
(74) *Attorney, Agent, or Firm* — Lee Law, PLLC; Christopher B. Lee

(57) ABSTRACT

An invention is disclosed for improved computer network efficiency in use of remote procedure call (RPC) client/server applications functioning within dynamic virtual networks. Specifically, a method and system are disclosed for use of an RPC mapping program to provide a client with the network communications protocol address(es) having the highest probability of successfully establishing a connection with a server, in order to maximize the probability that the communications interface between client and server will be created in the minimum number of calling attempts.

6 Claims, 1 Drawing Sheet

Figure 1:
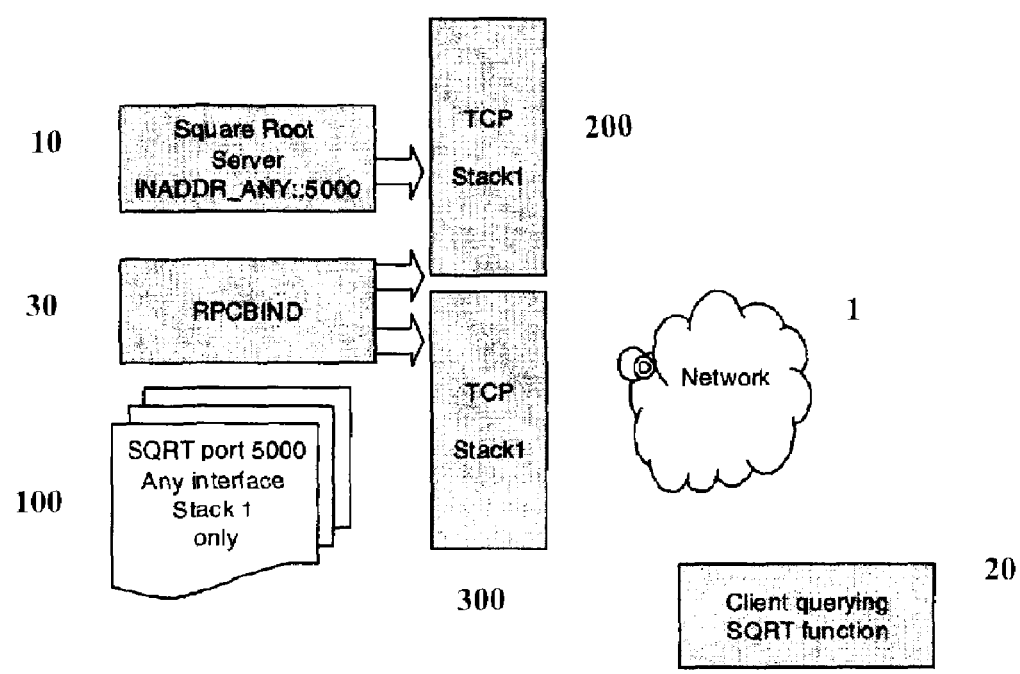

METHOD AND SYSTEM FOR IMPROVED COMPUTER NETWORK EFFICIENCY IN USE OF REMOTE PROCEDURE CALL APPLICATIONS

TECHNICAL FIELD

This invention relates generally to use of remote procedure call (RPC) computer network applications, and specifically to a method and system for providing a client with the communications interface address(es) having the highest probability of successfully establishing a connection with a server in a dynamic virtual network.

BACKGROUND

A remote procedure call ("RPC") protocol is a common programming method for implementing the client/server model of distributed computing, in which software operates to fulfill user needs by splitting functions between "client" tasks and "server" tasks performed by various computer resources that are organized into a "network" for communication with each other, such as a local area network ("LAN") or a wide area network ("WAN") or the Internet. Using this model, a "client" program sends message requests to a "server" program in order to obtain information or action according to some "protocol" (i.e., a set of standard rules that determine how data is transmitted across a network) and the server responds by carrying out the request or deferring it to another time or by indicating that it cannot be fulfilled. This model allows clients and servers to be located (and to operate) independently of each other in a computer network, often using different hardware and operating systems appropriate to the function of each. It should be noted that the terms "client" and "server" only apply to a particular transaction; a particular hardware entity (host) or software entity (process or program) could operate in both roles at different times. For example, a program that supplies a remote execution service could also be a client of a network file service.

The RPC model allows a network service to be defined by a collection of one or more remote programs implementing one or more remote procedures. The procedures, their parameters, and results are documented in the specific program's protocol specification, and a server may support more than one version of a remote program in order to be compatible with changing protocols. RPC protocols implement the client/server model by allowing a client program running on one "host" computer to cause code to be executed by a "remote" server program residing on another host computer, without requiring the programmer to explicitly write program code to accomplish this. The Open Network Computing ("ONC") RPC protocol is based on a model where the client invokes a server procedure residing in some well-specified network location by transferring control to (and eventually regaining control from) the procedure. The RPC protocol can be implemented using any of several different "network transport protocols" (such as User Datagram Protocol ("UDP") or Transmission Control Protocol over Internet Protocol ("TCP/IP")) that determine how to control the resources of the network to provide virtual error-free point-to-point connections between hosts for transmission of messages over the network.

A remote procedure call is initiated by the caller (client) sending a "request (or call) message" over the network to a remote system (the server), seeking execution of a certain server program procedure using "arguments" (or parameters) supplied by the client, which can contain the data to be processed as well as information on the action(s) to be taken in providing the result. A "result (or reply) message" is then returned to the client indicating the results of the action(s) taken upon execution of the remote procedure call by the server. In one model, only one of the two processes is active at any given time, i.e., the client process sends the call message to the server process and waits for a reply message from the server containing the procedure results. Once the reply message is received by the client, the results of the procedure are extracted from the message and the client then continues execution of its own process(es). On the server side, a process is dormant awaiting the arrival of a call message from a client, at which point the server process extracts the procedure parameters from the message in order to compute the results and send a reply message containing the results to the calling client, whereupon the server then awaits the next call message from that (or another) client. Under this model, one thread of control winds through the calling client process and the responding server process in a synchronous manner. However, other implementations may be chosen in which RPC calls are asynchronously executed in order to allow the client to do useful work while waiting for the reply from the server. Another possibility is for the server to create a separate task for processing each incoming call so that it can be free to receive other requests during that time.

Each call and/or reply message using the RPC protocol must provide a unique specification of a procedure to be called, as well as provisions for matching response messages to request messages, and provisions for identifying (or "authenticating") client caller to responding service (and vice-versa) that may also include security and access-control mechanisms. An RPC service is identified by its "program number" and "version number", along with a "network address" specifying the location(s) of the host computer(s) where the server resides within the network and may be reached by a client program having access to this information. In the case of a service available using TCP/IP protocol, the network address will be an "internet protocol" (IP) address specifying the internet location(s) of the host(s) implementing that server, combined with a TCP "port number" specifying the host input/output (I/O) connection(s) used to communicate with the server at that IP address.

Applications rely on "mapping programs" to identify the locations (specified by "addresses") of various resources existing within a computer network. In remote procedure call (RPC) applications, clients use mapping programs (such as PORTMAP and RPCBIND) to determine the address locations of servers capable of executing various RPC functions within the network. A server identifies itself by "registering" its network address with RPCB1ND to indicate that it is available to remotely execute a procedure when called by a client located in the network. The client application then queries RPCBIND to determine the network address of the server that it seeks to use for execution of the desired procedure. The RPCBIND protocol is used to associate (or "map") RPC program and version numbers to "universal network addresses" in order to make dynamic client invocation of remote server programs possible. Each RPCBIND program is located at a well-known network address, and associated RPC server programs register their dynamically allocated network addresses with it. The RPCBIND program then makes those addresses publicly available to clients seeking use of the registered servers. The RPCBIND program can be used for connecting RPC clients and servers over any network transport protocol.

A common use of an RPC client/server application is in allocating network memory resources using Network File System ("NFS") servers that perform "read", "write" and "control" procedures allowing local clients to use remote storage systems within the computer network. For example, a network file service may be composed of two program procedures, permitting one procedure to perform high-level applications such as file system access control, while the other executes low-level file input and output functions such as "reading" and "writing" the data contained in the files. A client of the network file service would request (or "call") the RPC server to execute these procedures for use by the client. As an example, when a "NET USE" or "MAP NETWORK DRIVE" command is initiated from a local computer workstation running the Microsoft Windows® operating system, the workstation invokes an RPC client application that queries an RPC server to execute a process assigning use of a remotely located memory storage disk to the workstation. Other common examples of RPC applications include Customer Information Control System ("CICS") payroll, accounting, or other business applications.

A problem with current RPC protocols arises from the dynamic nature of a computer network, in which distributed shared resources are "virtually" allocated on a temporary changing as-needed basis to permit the system to maintain control over access to them. If a server registers with RPCBIND by providing the IP address and port it is using at a certain point in time, the network may then change dynamically in a way that prevents a client from reaching the server if it queries RPCBIND for this resource location at another point in time, since the server IP address and/or port may have changed in the interim. The client may also obtain an address that the server is no longer using to process remote procedure calls. RFC Internet Standards 1831, 1832, and 1833 (the contents of which are all incorporated by reference as if fully set forth herein) explain how applications can use RPC protocols in distributed client/server networks, but these standards do not address use of such protocols in dynamic virtual networks.

SUMMARY OF THE INVENTION

An invention is disclosed for improved computer network efficiency in use of remote procedure call (RPC) client/server applications functioning within dynamic virtual networks. Specifically, a method and system are disclosed for use of an RPC mapping program to provide a client with the network communications protocol address(es) having the highest probability of successfully establishing a connection with a server, in order to maximize the probability that the communications interface between client and server will be created in the minimum number of calling attempts.

This is preferably accomplished through use of the RPCBIND mapping program to track network connection status, in order to identify the address/port combinations that are most likely to be used by a server in establishing a communications interface with a client. One implementation of this technique involves use of the RPCBIND protocol to record the network address configuration at the point(s) in time when a server is registered for use, so that this information can be used to provide the most accurate connection information to the calling client when it queries RPCBIND to obtain the TCP port and IP address of the called server. Using an RPC mapping program to track and record the status of available connections in this manner allows up-to-date information to be provided at the time of the client query, such as those network address(es) that become available at the time of the RPC request as opposed to the time of server registration.

It is therefore an object of the present invention to overcome the disadvantages of the prior art by providing improved computer network efficiency in use of remote procedure call (RPC) client/server applications functioning within dynamic virtual networks, through disclosure of a method and system for use of an RPC mapping program to provide a client with the network communications protocol address(es) having the highest probability of successfully establishing a connection with a server, in order to maximize the probability that the communications interface between client and server will be created in the minimum number of calling attempts.

It is another object of the present invention to overcome the disadvantages of the prior art by providing improved computer network efficiency in use of RPC client/server applications, through disclosure of a method and system for use of the RPCBIND application program interface (API) protocol to track network connection status, in order to identify the address/port combinations that are most likely to be used by a server in establishing a communications interface with a client.

It is another object of the present invention to overcome the disadvantages of the prior art by providing improved computer network efficiency in use of RPC client/server applications, through disclosure of a method and system for use of the RPCBIND protocol to record and track the network address configuration at the point(s) in time when a server is registered for use, so that this information can be used to provide the most accurate connection information to the calling client when RPCBIND is queried to obtain the TCP port and IP address of the called server.

It is another object of the present invention to overcome the disadvantages of the prior art by providing improved computer network efficiency in use of RPC client/server applications, through disclosure of a method and system for use of an RPC mapping program to track and record the status of available network connections so that up-to-date information is provided at the time of the client query, such as those network address(es) that become available at the time of the RPC request as opposed to the time of server registration.

The subject matter which is regarded as the invention is particularly pointed out and distinctly claimed in the concluding portion of the specification. The invention, however, together with further objects and advantages thereof, may best be understood by reference to the following description taken in conjunction with the accompanying drawings.

BRIEF DESCRIPTION OF THE DETAILED DRAWINGS

FIG. 1 is a diagram illustrating use of the invention in remote procedure call (RPC) client/server applications.

DETAILED DESCRIPTION OF THE PREFERRED EMBODIMENTS

The client locates the network TCP/IP address and port of the server for a remote procedure call (RPC) by using a mapping program such as the RPCBIND application programming interface ("API"). The RPC server located on the remote host computer having physical access to the disk must initially "register" with RPCBIND, by identifying the IP address(es) and port(s) that the server is using to accept client call messages (or "listening on") for each transport protocol (such as TCP or UDP) and versions of network mapping software (such as NFS) that it supports. For example as shown in FIG. 1, a "math SQRT server" 10 is activated for use by registering with RPCBIND 30 to indicate that it can process mathematics function calls (such as calculating a square root)

by communicating at certain network address(es) 100. When a client application 20 requires this service, it queries RPCBIND 30 to determine the network address 100 it should use to send requests to the server 10 for a square root calculation. A server tends to register with RPCBIND using a generic address (such as INADDR_ANY or IN6ADDR_ANY) that allows it to communicate with any network client having access to an address that can be used to set up an interface through the port associated with that server. The RPCBIND binding protocol procedures most commonly used to query a server are RPCBPROC_GETADDRLIST and RPCBPROC_GETVERSADDR as documented in RFC 1833.

FIG. 1 illustrates the problem with current RPC protocols arising from the dynamic virtual allocation of resources within a computer network 1. For example, if a host computer is "multihomed" and uses more than one TCP/IP stack to report IP addresses for use by RPCBIND 30 in processing remote procedure calls from network clients 20, and a server 10 opens up a communications interface (or "socket") by registering a generic address (INADDR_ANY) 100 that is placed on one stack 200 (TCP_STACK_1) before another stack 300 (TCP_STACK_2) is activated, the server will not be reachable by clients through use of the second stack 300 because the server is not "listening" for client calls on that stack. Also, if a different server is listening for client calls by registering the same TCP port on the second stack, RPCBIND will cause the client to make the remote procedure call to the wrong server. These problems could cause data to be delivered to unauthorized applications or other programming errors.

Another problem arises in using certain transport protocols (such as UDP) that require the data to fit within a limited allocated range of space (i.e., number of bits or bytes) in order to be transmitted together in "packet" form. In such cases, if an RPC server registered with a generic IP address (INADDR_ANY) and the number of possible addresses it can use to establish a communications interface with a client exceeds the maximum number that can be identified within the allocated packet space, it may not be possible to designate an address that the client can access within the allocated space. This creates a problem in a MLS (Multi-level Security) secure network since there are often only a few interfaces that the client has security authorization to communicate across.

A costly solution to this problem would involve determining the point in time when each new stack is activated and then requiring each available server to re-register its network address at that time. However, there is no documented method for efficiently using such a technique when hosts (z/OS in particular) have many communications interfaces within large networks, since each called server address must be tested through use of a "timeout scenario" to establish or eliminate use of that address by a calling client. Some cases may involve at least fifty (50) different IP address/port combinations for a host containing a server that has registered with a generic IP address (INADDR_ANY) using a specific port, and the client may be required to attempt use of at least half of the combinations on average (and possibly almost all of them in some instances) before finding an address/port combination that will work, requiring a mean time of approximately a minute (and a maximum of almost two minutes) before a connection is established between the client and server.

Thus, although it may be possible to use one or more of multiple network addresses in establishing an RPC communications interface between server and client, efficiency is improved for remote procedure applications if the address(es) having the highest probability of success are initially returned to the client to establish the connection. The solution to this problem proposed by the invention is to use the RPC mapping program to identify the network address/port combinations that are most likely to be used by a server in establishing a communications interface with a client, in order to maximize the probability that the connection between client and server will be created in the minimum number of calling attempts.

A preferred way of implementing this is to require the RPCBIND server to record and track the network address configuration at the point(s) in time when a server is registered for use as a network resource, so that this information can be used to provide the most accurate connection information to the calling client when it queries RPCBIND to obtain the TCP port and IP address of the called server. For example as shown in FIG. 1, when RPC server 10 registers by providing a generic address (INADDR_ANY or IN6ADDR_ANY), RPCBIND 30 will determine those TCP/IP stacks 200 & 300 that are available for use with server 10 listening on port 100. When a calling client 20 queries RPCBIND 30 to obtain the port and IP address of the called server 10, RPCBIND 30 will use the network address stack configuration tracking information to provide the most likely to be used server address and port combination to the client 20. For example, if RPCBIND 30 has recorded that only stack 200 was active when server 10 registered, it would note to client 20 that server 10 can only be reached through use of stack 200 (by obtaining the server address from that stack for use in making the remote procedure call) even if other stacks later become available. Using the RPCBIND mapping program to track and record the status of available network connections in this manner allows up-to-date information to be provided at the time of the client query, such as those network address(es) that become available at the time of the RPC request as opposed to the time of server registration.

While certain preferred features of the invention have been shown by way of illustration, many modifications and changes can be made that fall within the true spirit of the invention as embodied in the following claims, which are to be interpreted as broadly as the law permits to cover the full scope of the invention, including all equivalents thereto.

What is claimed is:

1. A system, comprising:
    a memory; and
    a remote procedure call (RPC) binding server configured to:
    track status changes associated with available network connections to virtually allocated distributed shared resources within a dynamic virtual network for an active server;
    record, via at least one RPCBIND mapping program associated with the RPC binding server, the status changes associated with the available network connections to the virtually allocated distributed shared resources within the dynamic virtual network for the active server within the memory at points in time when the active server is registered by the dynamic virtual network;
    identify, in response to receipt of a query for connection information associated with the active server from a client, address and port combinations from the available network connections that maximize a probability of creating a communications interface between the client and the active server in a minimum number of calling attempts based upon the recorded status changes associated with the available network connections;

select the identified address and port combinations that maximize the probability of creating the communications interface between the client and the active server in the minimum number of calling attempts; and provide, via the at least one RPCBIND mapping program, the selected address and port combinations to the client for establishing the communications interface with the active server based upon the tracked status changes associated with the available network connections.

2. The system of claim 1, where the recorded status changes associated with the available network connections are used to provide up-to-date server address and port combinations available at the time of the client query.

3. The system of claim 1, where a connection between the client and the active server is created using Transmission Control Protocol over Internet Protocol (TCP/IP) as a network communications protocol.

4. A method, comprising:
tracking, via a remote procedure call (RPC) binding server, status changes associated with available network connections to virtually allocated distributed shared resources within a dynamic virtual network for an active server;

recording, via at least one RPCBIND mapping program associated with the RPC binding server, the status changes associated with the available network connections to the virtually allocated distributed shared resources within the dynamic virtual network for the active server at points in time when the active server is registered by the dynamic virtual network;

identifying, in response to receipt of a query for connection information associated with the active server from a client, address and port combinations from the available network connections that maximize a probability of creating a communications interface between the client and the active server in a minimum number of calling attempts based upon the recorded status changes associated with the available network connections;

selecting the identified address and port combinations that maximize the probability of creating the communications interface between the client and the active server in the minimum number of calling attempts; and providing, via the at least one RPCBIND mapping program, the selected address and port combinations to the client for establishing the communications interface with the active server based upon the tracked status changes associated with the available network connections.

5. The method of claim 4, where the recorded status changes associated with the available network connections are used to provide up-to-date server address and port combinations available at the time of the client query.

6. The method of claim 4, further comprising creating a connection between the client and the active server using Transmission Control Protocol over Internet Protocol (TCP/IP) as a network communications protocol.

* * * * *